(12) United States Patent
Watanabe et al.

(10) Patent No.: US 12,313,640 B2
(45) Date of Patent: May 27, 2025

(54) VALIDATION DEVICE, VALIDATION METHOD AND NON-TRANSITORY COMPUTER READABLE MEDIUM

(71) Applicant: SHIMADZU CORPORATION, Kyoto (JP)

(72) Inventors: Satoru Watanabe, Kyoto (JP); Fuyuki Okamoto, Kyoto (JP); Chihiro Yasui, Kyoto (JP); Takeshi Yoshida, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 704 days.

(21) Appl. No.: 17/268,548

(22) PCT Filed: Aug. 30, 2018

(86) PCT No.: PCT/JP2018/032226
§ 371 (c)(1),
(2) Date: Feb. 15, 2021

(87) PCT Pub. No.: WO2020/044517
PCT Pub. Date: Mar. 5, 2020

(65) Prior Publication Data
US 2021/0318343 A1    Oct. 14, 2021

(51) Int. Cl.
*G01N 35/00* (2006.01)
(52) U.S. Cl.
CPC .................. *G01N 35/00613* (2013.01); *G01N 2035/0091* (2013.01)

(58) Field of Classification Search
None
See application file for complete search history.

(56) References Cited

U.S. PATENT DOCUMENTS

2003/0131290 A1* 7/2003 Weinberg ............ G06F 11/3664
714/E11.208
2009/0169092 A1* 7/2009 McCleary ............ G06V 10/987
382/141

(Continued)

FOREIGN PATENT DOCUMENTS

JP    2002-340907 A    11/2002
JP    2005-283332 A    10/2005
(Continued)

OTHER PUBLICATIONS

Espacenet machine translation of Sugioka Mikio, JP2002340907A, "A Validation Apparatus," Nov. 27, 2002 (Year: 2002).*

(Continued)

*Primary Examiner* — Michael J Dalbo
*Assistant Examiner* — Denise R Karavias
(74) *Attorney, Agent, or Firm* — Renner, Otto, Boisselle & Sklar, LLP

(57) ABSTRACT

Analysis control software is installed in an analysis control device. The analysis control software is the software for controlling an analysis device, and has a function of causing a display to display one or a plurality of operation images for (Continued)

receiving an operation for inspecting the analysis control software. In a validation device, operation commands for performing an operation on one or a plurality of operation images are sequentially generated by an inspection executor with the one or plurality of operation images displayed in the display, whereby an inspection is executed by the analysis control software.

9 Claims, 7 Drawing Sheets

(56) References Cited

U.S. PATENT DOCUMENTS

| | | | | |
|---|---|---|---|---|
| 2011/0314344 | A1* | 12/2011 | Okamoto | H04L 41/22 714/E11.178 |
| 2013/0232474 | A1* | 9/2013 | Leclair | G06F 11/3668 717/134 |
| 2015/0293134 | A1* | 10/2015 | Matsumoto | G01N 35/00623 422/67 |

FOREIGN PATENT DOCUMENTS

| | | |
|---|---|---|
| JP | 2013-167593 A | 8/2013 |
| JP | 2018-010016 A | 1/2018 |

OTHER PUBLICATIONS

Espacenet machine translation of Yoshida Atsushi, JP2005283332A, "A Validation System and Validation Program," Oct. 13, 2005 (Year: 2005).*
Espacenet machine translation of Ishibashi Isao, JP2013167593A, "Analyzer Control System and Program," Aug. 29, 2013 (Year: 2013).*
Office Action for corresponding JP Application No. 2020-539968 dated Dec. 14, 2021, with English language machine translation.
International Search Report with respect to International Patent Application No. PCT/JP2018/032226, mailed Oct. 16, 2018.
Written Opinion of the International Searching Authority with respect to International Patent Application No. PCT/JP2018/032226, mailed Oct. 16, 2018 (English Machine Translation).
Analytical Instrument Qualification and System Validation. 5990-3288JAJP, Agilent Technologies, Inc. pp.37-50, dated Jan. 1, 2009, and partial English Machine Translation.
Office Action in corresponding Chinese Patent Application No. 201880096746.3 dated Dec. 29, 2023, with English language machine translation.
Office Action in corresponding Chinese Patent Application No. 201880096746.3 dated Apr. 10, 2024, with English language machine translation.
Office Action in corresponding Chinese Patent Application No. 201880096746.3 dated Sep. 25, 2024, with English language machine translation.

* cited by examiner

FIG. 2

```
┌─────────────────────────────────────────────────────────┐
│ Software OQ Tool                                     ×  │
│                                                         │
│  DB                      [Create OQ Project] [Start Test]│
│                                                         │
│   User ID:       [_____]            │
│   User Name:     [_____]            │
│   Password:      [_____]            │
│   Location for SkyPDF: [_____]            │
│   Instrument Type:     [_____▼]            │
│   Dilution Factor:     [_____▼]            │
│   MultiDataReport:     [_____▼]            │
│                                                         │
│  ┌──────────────────────────────────────────────────┐   │
│  │                   Test                           │   │
│  ├──────────────────────────────────────────────────┤   │
│  │ ☑    1. FIRST INSPECTION ITEM                    │   │
│  │ ☐    2. SECOND INSPECTION ITEM                   │   │
│  │ ☑    3. THIRD INSPECTION ITEM                    │   │
│  │ ☑    4. FOURTH INSPECTION ITEM                   │   │
│  │ ☑    5. FIFTH INSPECTION ITEM                    │   │
│  │ ☑    6. SIXTH INSPECTION ITEM                    │   │
│  │ ☑    7. SEVENTH INSPECTION ITEM                  │   │
│  │ ☑    8. EIGHTH INSPECTION ITEM                   │   │
│  │ ☑    9. NINTH INSPECTION ITEM                    │   │
│  │ ☑   10. TENTH INSPECTION ITEM                    │   │
│  │ ☑   11. ELEVENTH INSPECTION ITEM                 │   │
│  │ ☑   12. TWELVETH INSPECTION ITEM                 │   │
│  └──────────────────────────────────────────────────┘   │
└─────────────────────────────────────────────────────────┘
```

FIG. 4

```
2018/08/03 14:29:13(+09:00) : CONFIRMATION[System Administrator]
                                              DOCUMENT NO. : 123456789000
   ○○○ CORPORATION
              HPLC SYSTEM
    Operational Qualification Protocol / Report
```

— 50

System ID

Customer Document No.

Installation Site

The undersigned performer reports that the Operational Qualification has been sucessfully completed for the system stated above.

Performer
- Name
- Date
- Signature
- Company

The undersigned reviewer and manager/approver report that the performer has completed the Operational Qualification successfully.

Reviewer
- Name
- Date
- Signature
- Company

Manager/Approver
- Name
- Date
- Signature
- Company

VALIDATION DEVICE, VALIDATION METHOD AND NON-TRANSITORY COMPUTER READABLE MEDIUM

TECHNICAL FIELD

The present invention relates to a validation device, a validation method and a non-transitory computer readable medium storing a validation program, for validating analysis control software.

BACKGROUND ART

In an analysis system, one or more analysis devices such as a liquid chromatograph or a gas chromatograph, and an analysis control device for controlling each analysis device may be provided. The analysis control device is a personal computer, for example, and predetermined analysis control software is installed in the analysis control device. The analysis control software runs on the analysis control device, whereby control of each analysis device, data collection, data management or data processing is executed.

After the analysis control software is installed in the analysis control device, it is necessary to validate integrity of the installation. Such validation includes validating the analysis control software satisfying the specification at the time of installation and validating the analysis control software satisfying defined performance (see Patent Document 1, for example). Generally, validation is executed when a technician such as a field engineer (hereinafter referred to as a performer) inspects the analysis control software in regard to an inspection item. Further, the performer creates a report that mentions a result of inspection, etc.

[Patent Document 1] JP 2013-167593 A

SUMMARY OF INVENTION

Technical Problem

Since a large number of inspection items are included in the above-mentioned validation, it is cumbersome to execute an inspection manually in regard to each of the inspection items. Therefore, validation is desirably automated. However, in a case where validation is automated, whether the same inspection as the inspection to be executed manually has been executed properly cannot be easily confirmed, and reliability of validation is lowered. In this manner, a reduction in time and labor for validation conflicts with maintenance of reliability of validation, and it is not easy to meet both of the requirements.

An object of the present invention is to provide a validation device, a validation method and a non-transitory computer readable medium storing a validation program that enable maintenance of reliability of validation while reducing time and labor for validating analysis control software.

Solution to Problem (1) A validation device according to one aspect of the present invention validates analysis control software that controls an analysis device, wherein the analysis control software has a function of causing a display to display one or a plurality of operation images for receiving an operation for inspecting the analysis control software, and the validation device includes an inspection executor that causes the analysis control software to execute an inspection by sequentially generating operation commands for performing an operation on the one or plurality of operation images with the one or plurality of operation images displayed in the display.

In this validation device, with the one or plurality of operation images displayed in the display by the analysis control software, the operation commands for performing an operation on the one or plurality of operation images are sequentially generated. In this case, a series of operations for inspecting the analysis control software are sequentially received by the analysis control software, and an inspection of the analysis control software is executed.

With this configuration, it is not necessary for the performer who manages the inspection of the analysis control software to execute an inspection of the analysis control software manually. Therefore, it reduces time and labor for validating the analysis control software. Further, the performer can identify that operation commands are sequentially received by the analysis control software and the steps of inspecting the analysis control software proceed in response to the received operation commands, by viewing the behavior of the one and plurality of operation images displayed in the display. Therefore, whether the same inspection as the inspection to be executed manually has been executed properly can be easily confirmed. As a result, it is possible to maintain reliability of validation while reducing time and labor for validating the analysis control software.

(2) The inspection executor may repeat generating an operation command every predetermined period of time in a case where each operation image is not displayed in the display at a time of generation of the operation command for performing an operation on the operation image. With this configuration, even in a case where performance of the analysis control device in which the analysis control software is installed is low, and one or a plurality of operation images displayed in the display are delayed to respond, an operation command for performing an operation on the one or plurality of operation images can be generated with the one or plurality of operation images displayed in the display.

(3) The validation device may further include a report creator that creates a report mentioning a result of inspection executed by the analysis control software. In this case, it is not necessary for the performer to manually create a report that mentions a result of inspection executed by the analysis control software. This reduces time and labor for the performer. Further, it prevents an error in transferring a result of inspection.

(4) The validation device may further include an activator that causes the display to display the one or plurality of operation images by activating the analysis control software. In this case, it is not necessary for the performer to activate the analysis control software manually. This reduces time and labor for the performer more sufficiently.

(5) The validation device may further include a mode switcher that switches an operation mode between an automatic mode and a manual mode, wherein the inspection executor may run in the automatic mode, and the analysis control software may cause the display to display a same operation image as the one or plurality of operation images to be displayed in the automatic mode, in the manual mode. In this case, the one or plurality of operation images to be displayed in the display in the automatic mode are the same as the one or plurality of operation images to be displayed manually by the performer in the display in the manual mode. Therefore, the performer can easily confirm whether the same inspection as the inspection to be executed manually has been executed properly.

(6) A validation method according to another aspect of the present invention validates analysis control software that controls an analysis device, wherein the analysis control software has a function of causing a display to display one or a plurality of operation images for receiving an operation for inspecting the analysis control software, and the validation method includes the step of causing the analysis control software to execute an inspection by sequentially generating operation commands for performing an operation on the one or plurality of operation images with the one or plurality of operation images displayed in the display.

With this validation method, it is not necessary for the performer who manages the inspection of the analysis control software to execute an inspection of the analysis control software manually. This reduces time and labor for validating the analysis control software. Further, the performer can identify that operation commands are sequentially received by the analysis control software and the steps of inspecting the analysis control software proceeds in response to the received operation commands, by viewing the behavior of the one and plurality of operation images displayed in the display. Therefore, whether the same inspection as the inspection to be executed manually has been executed properly can be easily confirmed. As a result, it is possible to maintain reliability of validation while reducing time and labor for validating the analysis control software.

(7) A non-transitory computer readable medium storing a validation program according to yet another aspect of the present invention validates analysis control software that controls an analysis device, wherein the analysis control software has a function of causing a display to display one or a plurality of operation images for receiving an operation for inspecting the analysis control software, and the validation program causes a processing device to execute the step of causing the analysis control software to execute an inspection by sequentially generating operation commands for performing an operation on the one or plurality of operation images with the one or plurality of operation images displayed in the display.

With this validation program, it is not necessary for the performer who manages inspection of the analysis control software to execute an inspection of the analysis control software manually. This reduces time and labor for validating the analysis control software. Further, the performer can identify that operation commands are sequentially received by the analysis control software and the steps of inspecting the analysis control software proceeds in response to the received operation commands, by viewing the behavior of the one and plurality of operation images displayed in the display. Therefore, whether the same inspection as the inspection to be executed manually has been executed properly can be easily confirmed. As a result, it is possible to maintain reliability of validation while reducing time and labor for validating the analysis control software.

Advantageous Effects of Invention

It is possible to maintain reliability of validation while reducing time and labor for validating the analysis control software.

BRIEF DESCRIPTION OF THE DRAWINGS

FIG. 2 is a diagram showing one example of an initial screen displayed in a display in an automatic mode.

FIG. 4 is a diagram showing one example of a report showing a result of inspection.

DESCRIPTION OF EMBODIMENTS (1) Configuration of Analysis System

Figure 1:
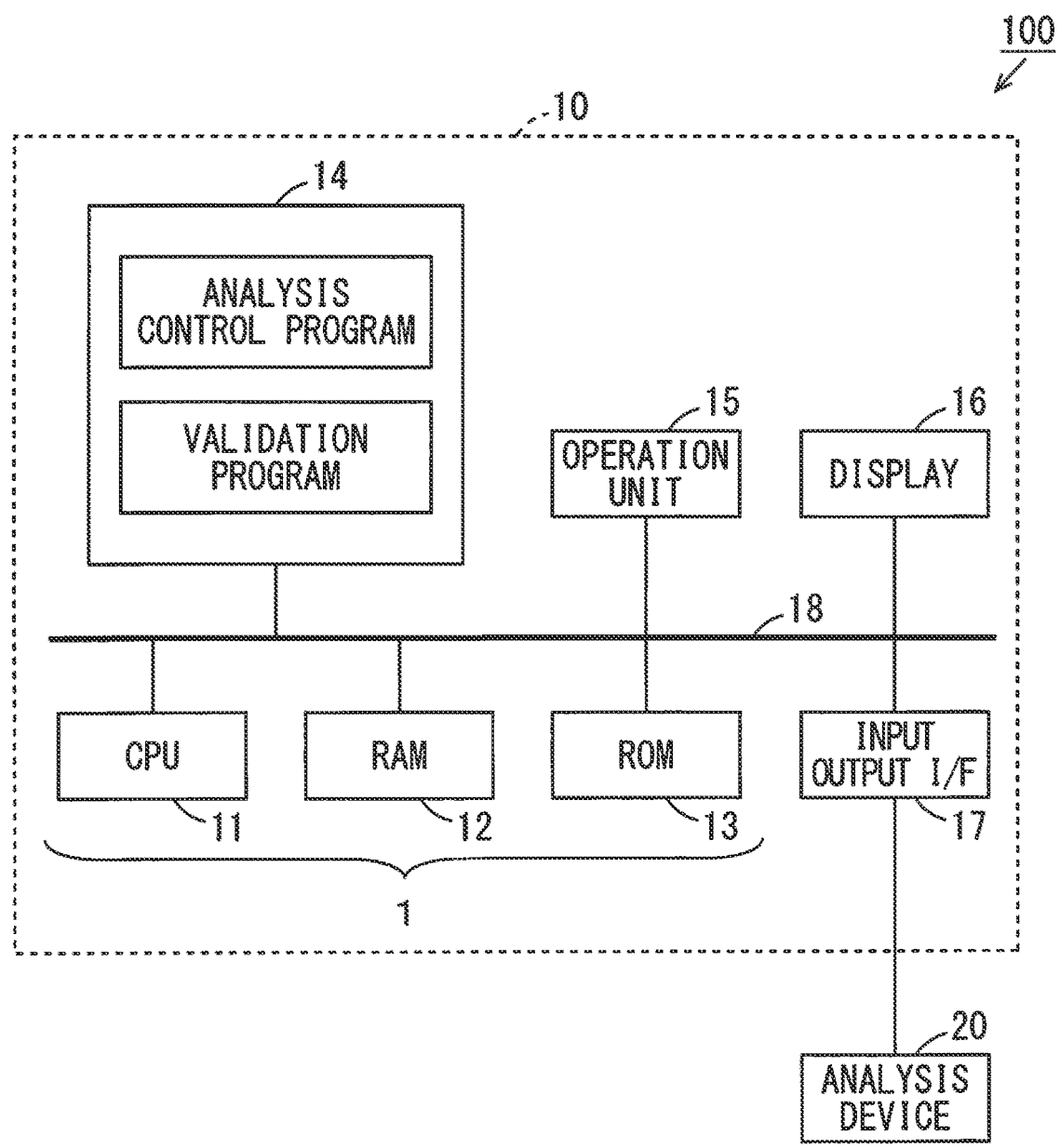
FIG. 1 is a diagram showing the configuration of an analysis system including a validation device according to one embodiment of the present invention.

A validation device, a validation method and a non-transitory computer readable medium storing a validation program according to embodiments of the present invention will be described below in detail with reference to the drawings. FIG. 1 is a diagram showing the configuration of an analysis system including the validation device according to one embodiment of the present invention. As shown in FIG. 1, the analysis system 100 includes an analysis control device 10 and an analysis device 20. The analysis system 100 may include a plurality of analysis devices 20. The analysis device 20 is a liquid chromatograph or a gas chromatograph.

The analysis control device 10 is constituted by a CPU (Central Processing Unit) 11, a RAM (Random Access Memory) 12, a ROM (Read Only Memory) 13, a storage 14, an operation unit 15, a display 16 and an input output I/F (interface) 17. The CPU 11, the RAM 12, the ROM 13, the storage 14, the operation unit 15, the display 16 and the input output I/F 17 are connected to a bus 18. The CPU 11, the RAM 12 and the ROM 13 constitute the validation device 1.

The RAM 12 is used as a work area for the CPU 11. A system program is stored in the ROM 13. The storage 14 includes a storage medium such as a hard disc or a semiconductor memory. An analysis control program for controlling the analysis device 20 is stored in the storage 14, whereby analysis control software is installed in the analysis control device 10.

After the analysis control software is installed in the analysis control device 10, it is necessary to validate integrity of the installation. This integrity is validated by execution of a predetermined inspection in regard to the analysis control software. The analysis control software has a function of causing the display 16 to display one or a plurality of operation images for receiving an operation for inspecting the analysis control software.

Further, the validation program is stored in the storage 14. The validation program may be stored in a storage medium different from the storage 14. The CPU 11 executes the validation program stored in the storage 14 or the like on the RAM 12, whereby a validation process is executed. The validation process is a process of causing the analysis control software to execute an inspection by sequentially generating operation commands for performing an operation on the above-mentioned operation images displayed in the display 16.

The operation unit 15 is an input device such as a keyboard, a mouse or a touch panel. The display 16 is a display device such as a liquid crystal display device. A performer, described below, can provide various instructions to the validation device 1 using the operation unit 15. The display 16 displays an execution screen for the control by the analysis control software, an execution screen for the validation process by the validation device 1 or the like. The input output I/F 17 is connected to the analysis device 20.

(2) Running of Validation Device

The validation device 1 selectively runs in a manual mode and an automatic mode. In the manual mode, a technician such as a field engineer (hereinafter referred to as a performer) executes an inspection manually in regard to each of required inspection items in accordance with the type of the analysis device 20. Examples of the inspection items include a time setting and its confirmation, checking of tampering of the analysis control program and confirmation of version of the analysis control software, confirmation of running of a function of authenticating a user, etc.

When an inspection in regard to each inspection item is to be executed, a window corresponding to the inspection item is displayed in the display 16 as a GUI (Graphical User Interface) by the analysis control software. One or more menus or icons such as a button are displayed in the window as the operation images. The performer performs an operation on a predetermined operation image in the window corresponding to each inspection item using the operation unit 15, thereby being able to execute an inspection in regard to the inspection item. Further, the performer creates a report that mentions a result of inspection, the name of the performer, inspection execution date and time and so on.

In the automatic mode, an inspection in regard to at least part of the inspection items designated by the performer is executed automatically. FIG. 2 is a diagram showing one example of an initial screen displayed in the display 16 in the automatic mode. As shown in FIG. 2, the initial screen 30 includes a plurality of information input sections 31, an item selection list 32 and a start button 33. Each information input section 31 is a field or a pull-down menu in which a character string is to be input. The performer can set information in regard to a user of the analysis system 100, information in regard to the analysis device 20 and the like in the validation device 1 by performing an operation on each information input section 31 using the operation unit 15.

In the item selection list 32, a plurality (twelve in the example of FIG. 2) of inspection items corresponding to the analysis device 20 for which settings have been made are displayed, and a plurality of check boxes 32a respectively corresponding to the plurality of inspection items are displayed. In the following description, N inspection items are respectively referred to as first to N-th inspection items (N is an integer that is equal to or larger than 1). The performer can designate a required inspection item by performing an operation on a check box 32a corresponding to a desired inspection item using the operation unit 15.

Thereafter, the performer performs an operation on the start button 33 using the operation unit 15, whereby the analysis control software is activated, and an inspection in regard to the designated inspection item is started automatically. Here, in a case where an inspection in regard to the inspection item is automated, it is not possible to easily confirm whether the same inspection as the manual inspection has been executed properly. As such, when an inspection in regard to each inspection item is to be executed in the automatic mode, the same GUI as the GUI to be displayed at the time of an inspection in regard to the inspection item in the manual mode is displayed in the display 16. In the automatic mode, it is possible to easily confirm that the same inspection as the manual inspection is executed, by viewing the display of the GUI.

Figure 3:
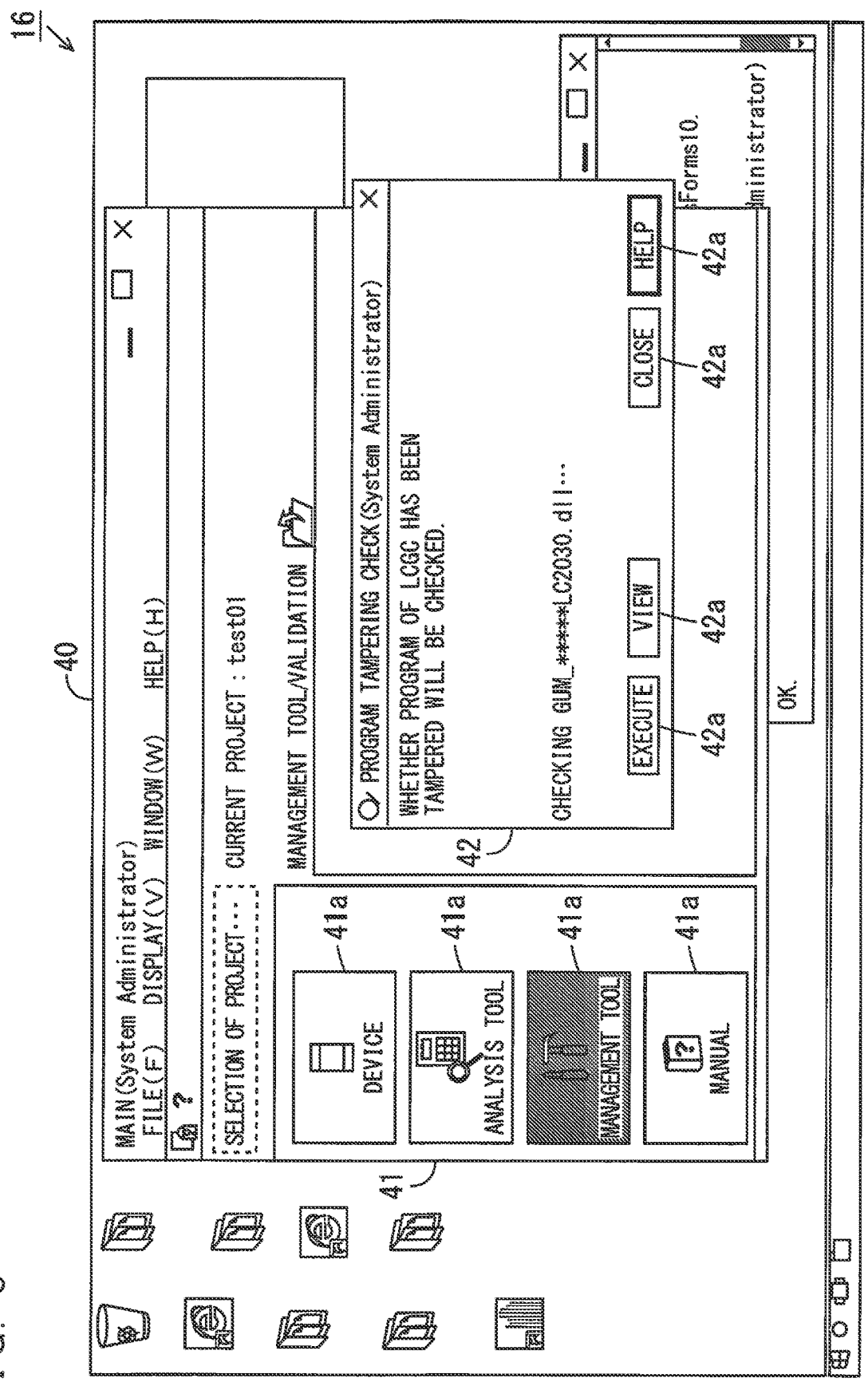
FIG. 3 is a diagram showing a display example of the display in the automatic mode.

FIG. 3 is a diagram showing one example of an execution screen 40 for an inspection in the automatic mode. In the example of FIG. 3, a plurality of windows 41, 42 corresponding to the inspection in regard to the predetermined inspection items are displayed in a state where the windows 41, 42 are arranged in a left-and-right direction. A plurality of operation images 41a are displayed in the window 41, and a plurality of operation images 42a are displayed in the window 42. In this example, an operation is performed on a predetermined operation image 41a in the window 41, whereby the window 42 is displayed, and the window 41 is put in a deactivated state. Thereafter, an operation is performed on a predetermined operation image 42a in the window 42, whereby an inspection in regard to the inspection item ends.

A unique identifier is provided in each of the plurality of operation images. In the automatic mode, an operation command designating an identifier of an operation image is generated with the predetermined operation image displayed in the display 16. Thus, an operation is performed on the operation image. Therefore, a macro made of a plurality of operation commands for sequentially designating the identifiers of the plurality of operation images is generated in advance, whereby the inspection designated by a series of operations performed on the operation images can be executed automatically.

Here, a response time from the time when an operation is performed on an operation image in any of the windows until the time when a next window is displayed differs depending on performance of the analysis control device 10. Even in a case where an operation command for designating an identifier of an operation image is generated before a window including the predetermined operation image is displayed, an operation is not performed on the operation image. As such, in a case where designation of an identifier of an operation image by each operation command is not received, a predetermined waiting time is provided, and the operation command is generated again after the waiting time elapses. Thus, even in a case where a response is delayed and a window is displayed late, an operation can be performed on an operation image included in the window.

After an inspection in regard to a designated inspection item ends, a report mentioning a result of inspection is created automatically. FIG. 4 is a diagram showing one example of a report showing a result of inspection. The report 50 is an electronic PDF (Portable Document Format) file, for example, and only the first page of the report 50 is shown in FIG. 4. The report 50 is created by transfer of the result of inspection, the name of the performer, the inspection execution date and time and so on to a predetermined format. Therefore, it is not necessary for the performer to create a report manually. This reduces time and labor for the performer. Further, an error in transferring a result of inspection and so on can be prevented.

(3) Validation Process

Figure 5:
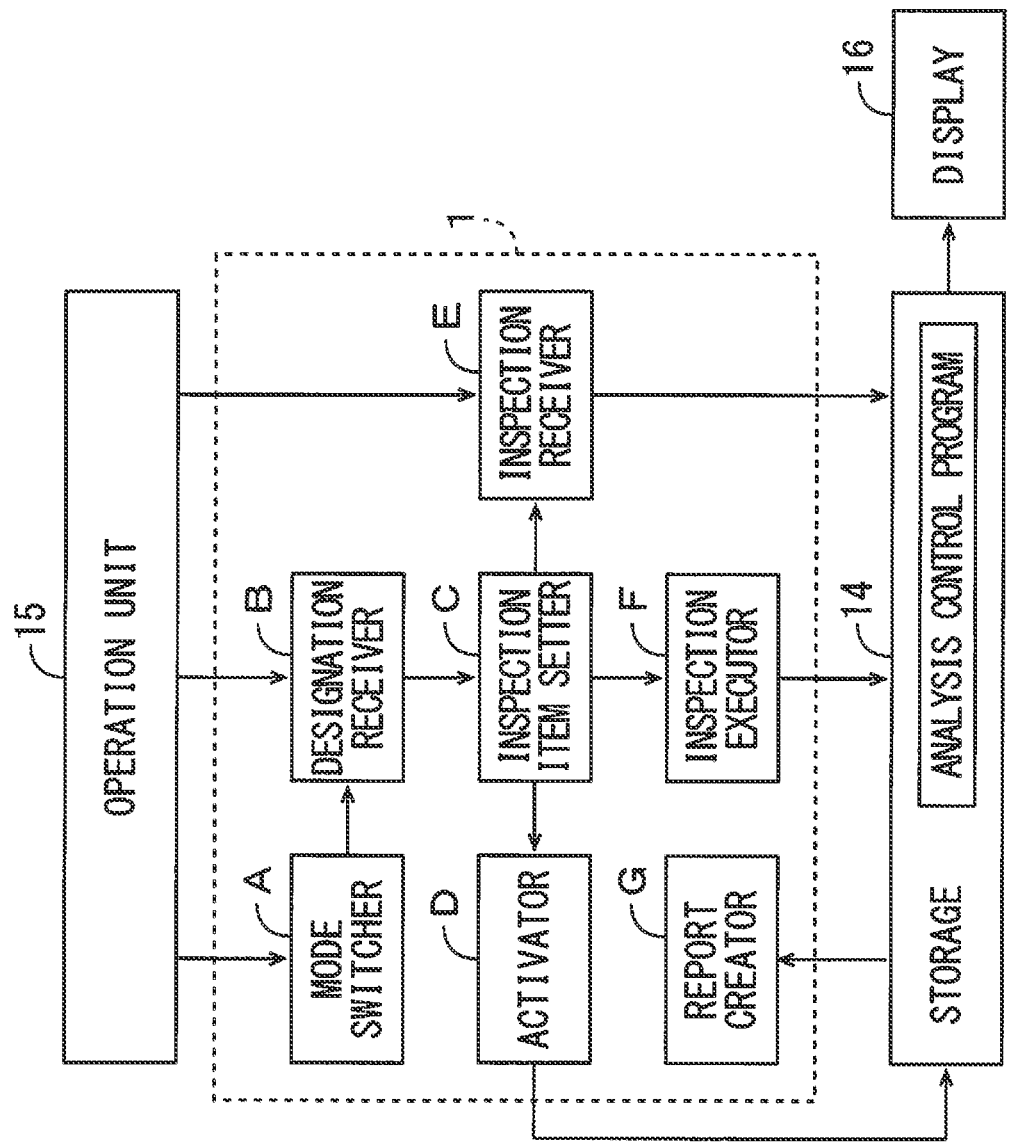
FIG. 5 is a diagram showing the configuration of a validation device.
Figure 6:
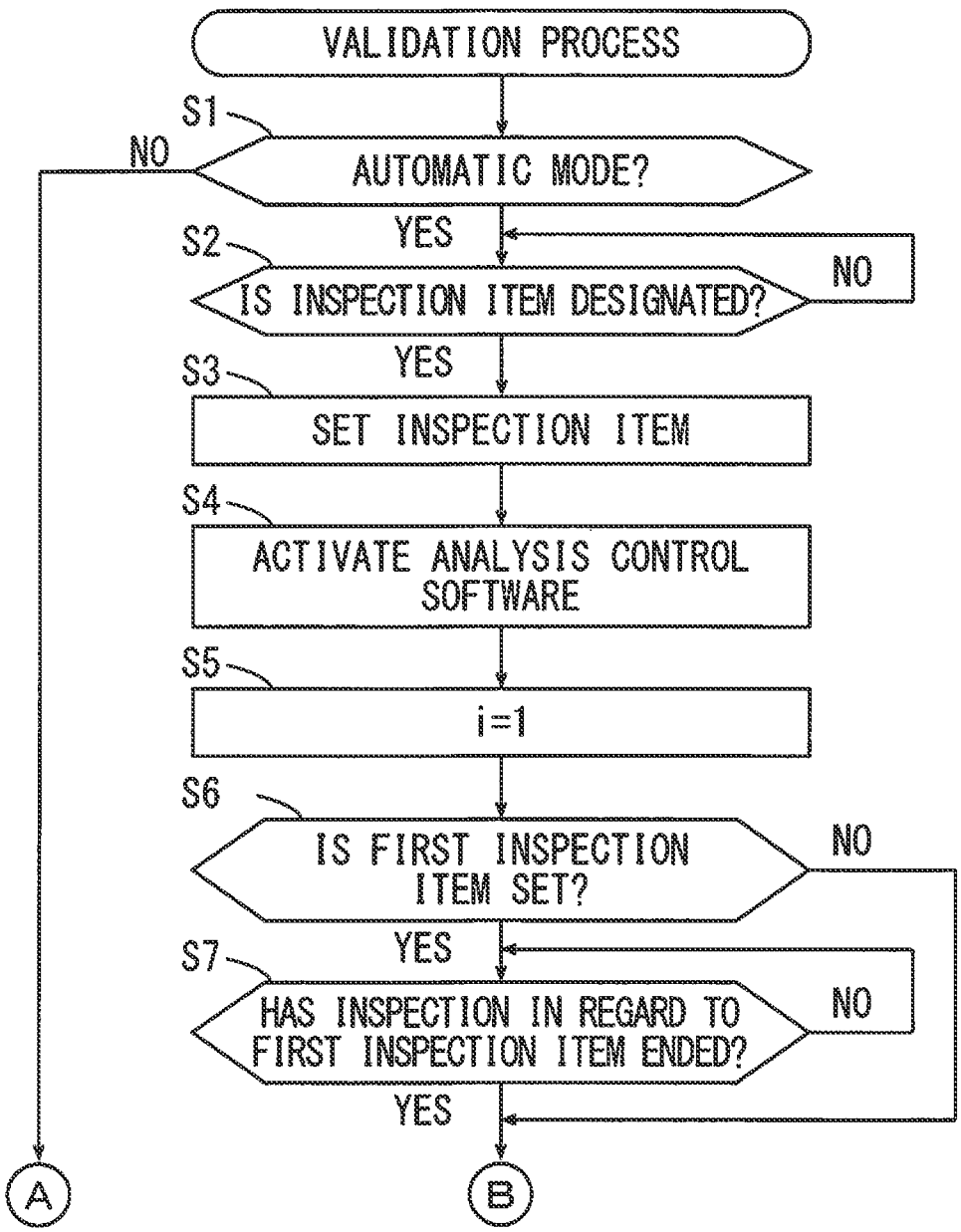
FIG. 6 is a flowchart showing the algorithm of a validation process to be executed by a validation program.
Figure 7:
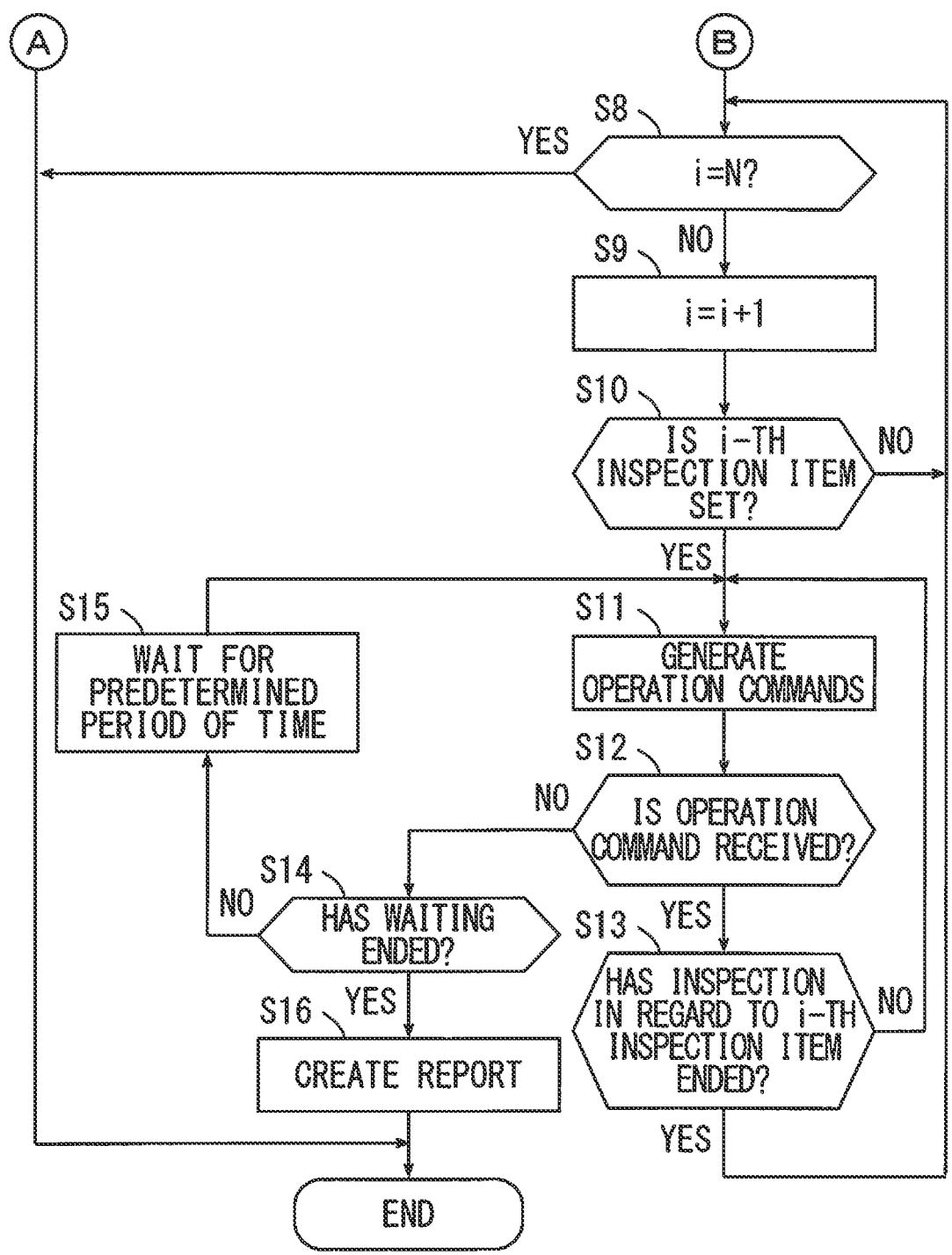
FIG. 7 is a flowchart showing the algorithm of the validation process to be executed by the validation program.

FIG. 5 is a diagram showing the configuration of the validation device 1. FIGS. 6 and 7 are flowcharts showing the algorithm of the validation process executed by the validation program. As shown in FIG. 5, the validation device 1 includes a mode switcher A, a designation receiver B, an inspection item setter C, an activator D, an inspection receiver E, an inspection executor F and a report creator G as functions.

The CPU 11 of FIG. 1 executes the validation program stored in the storage 14 or the like, whereby the functions of the validation device 1 are implemented. Part or all of the functions of the validation device 1 may be implemented by hardware such as an electronic circuit. The validation process will be described below with reference to the validation device 1 of FIG. 5 and the flowcharts of FIGS. 6 and 7.

The mode switcher A can switch the operation mode of the validation device 1 between the automatic mode and the manual mode based on an operation performed by the performer with use of the operation unit 15. Here, the mode switcher A determines whether the operation mode is in the automatic mode (step S1). In a case where the operation mode is not in the automatic mode, that is, the operation mode is in the manual mode, the mode switcher A ends the validation process. In this case, validation in regard to the integrity of installation of the analysis control software is executed manually by the performer, and a report is created manually by the performer.

In a case where the operation mode is in the automatic mode, the designation receiver B determines whether designation of an inspection item has been received (step S2). The performer can designate one or more inspection items by performing a predetermined operation on the initial screen 30 of FIG. 2 using the operation unit 15. In a case where designation of an inspection item is not received, the designation receiver B waits until designation of an inspection item is received.

In a case where designation of an inspection item is received, the inspection item setter C sets a received inspection item (step S3). Thereafter, the activator D activates the analysis control software (step S4). Further, the inspection item setter C sets the value of a variable i to 1 (step S5) and determines whether a first inspection item is set (step S6). In a case where the first inspection item is not set, the inspection item setter C proceeds to the step S8.

In a case where the first inspection item is set, the inspection receiver E determines whether an inspection in regard to the first inspection item has ended (step S7). In the present example, the first inspection item corresponds to the time setting and its confirmation. In this case, the performer confirms the current time by a time signal, etc. and inputs the confirmed current time to the inspection receiver E using the operation unit 15.

The inspection receiver E receives the input and sets the received input in the analysis control software, whereby an inspection in regard to the first inspection item ends. In a case where the inspection in regard to the first inspection item has not ended, the inspection receiver E waits until the inspection in regard to the first inspection item ends. In a case where the inspection in regard to the first inspection item ends, the inspection receiver E proceeds to the step S8.

In the step S8, the inspection item setter C determines whether the value of a variable i is N (step S8). In a case where the value of the variable i is N, the inspection item setter C proceeds to the step S16. In a case where the value of the variable i is not N, the inspection item setter C increases the value of the variable i by 1 (step S9) and determines whether the i-th inspection item is set (step S10). In a case where the i-th inspection item is not set, the inspection item setter C returns to the step S8.

In a case where the i-th inspection item is set, the inspection executor F generates an operation command for designating an identifier of an operation image (step S11). Next, whether the generated operation command is received by the analysis control software is determined (step S12). Here, in a case where the operation image of the GUI corresponding to the generated operation command is displayed in the display 16, the operation command is received by the analysis control software, and at least part of the inspection in regard to the i-th inspection item is executed.

In this case, the inspection executor F determines whether the inspection in regard to the i-th inspection item has ended (step S13). In a case where the inspection in regard to the i-th inspection item has not ended, the inspection executor F returns to the step S11. In a case where the inspection in regard to the i-th inspection item has ended, the inspection executor F returns to the step S8.

On the other hand, in a case where the operation image of the GUI corresponding to the operation command generated in the step S11 is not displayed in the display 16, the operation command is not received by the analysis control software. In this case, the inspection executor F determines whether to end waiting (step S14). Here, in a case where the step S15, described below, is executed a predetermined number of times, the inspection executor F determines to end waiting. In a case where waiting is to be ended, an inspection is interrupted, and the inspection executor proceeds to the step S16. In a case where waiting is not to be ended, the inspection executor F waits for a predetermined period of time (step S15) and returns to the step S11.

In the step S16, the report creator G creates a report 50 (step S16) and ends the validation process. Here, in a case where the process proceeds from the step S8 to the step S16, results of inspection in regard to all of the inspection items set in the step S3 are mentioned in the generated report 50. On the other hand, in a case where the process proceeds from the step S14 to the step S16, "failed" is mentioned as a result of inspection in regard to the inspection item corresponding to the interrupted inspection, and results of inspection in regard to the subsequent inspection items are not mentioned, in the generated report 50.

(4) Effects

In the validation device 1 according to the present embodiment, the operation commands for performing an operation on the GUI are sequentially generated by the inspection executor F with the GUI displayed in the display 16 by the analysis control software. In this case, a series of operations for inspecting the analysis control software are sequentially received by the analysis control software, and an inspection of the analysis control software is executed.

With this configuration, it is not necessary for the performer to execute an inspection of the analysis control software manually. This reduces time and labor for validating the analysis control software. Further, the performer can identify that operation commands are sequentially received by the analysis control software and the steps of inspecting the analysis control software proceeds in response to the received operation commands, by viewing the behavior of the GUI displayed in the display 16. Therefore, whether the same inspection as the inspection to be executed manually has been executed properly can be easily confirmed. As a result, it is possible to maintain reliability of validation while reducing time and labor for validating the analysis control software.

Further, the GUI displayed in the display 16 in the automatic mode is the same GUI as the GUI to be displayed in the display 16 by a manual operation performed by of the performer in the manual mode. Therefore, the performer can easily confirm whether the same inspection as the inspection to be executed manually has been executed properly. Further, the performer can easily explain to the user of the analysis system 100 that the same inspection as the inspection to be executed manually has been executed.

(5) Other Embodiments

While the inspection in regard to the first inspection item is not executed automatically but inspected manually by the performer in the above-mentioned embodiment, the present invention is not limited to this. In a case where the analysis control device 10 is provided to be connectable to the Internet or the GPS (Global Positioning System), for example, and can acquire a current time, the inspection in regard to the first inspection item may be executed automatically. In this case, the steps S6 and S7 in the validation process are not executed, and the inspection item setter C executes the step S10 after the step S5.

Further, while the validation device 1 includes the activator D and the report creator G in the above-mentioned embodiment, the present invention is not limited to this. In a case where the performer activates the analysis control software manually, the validation device 1 does not have to include the activator D. Similarly, in a case where the performer creates a report manually, the validation device 1 does not have to include the report creator G.

The invention claimed is:

1. A validation device for visually validating analysis control software that controls a chromatography system by executing the analysis control software, the validation device, comprising a processor configured to:
   display to a user designatable inspection items;
   receive from the user a designated inspection item;
   perform an inspection of the designated inspection item by:
      causing the analysis control software to display a user interface for inspecting the designated inspection item, wherein:
         the user interface includes one or a plurality of user interface elements; and
         each of the one or plurality of user interface elements are associated with an operation performed in the inspection of the analysis control software;
      sequentially performing operation commands that each visibly interact with an associated element of the one or plurality of user interface elements to perform the associated operation for inspecting the analysis control software, wherein the sequential performance of the operation commands comprises, for each of the operation commands:
         determining whether the associated element is visible and whether the operation command is received the analysis control software;
         when it is determined that the associated element is visible and the operation command is received by the analysis control software, performing the operation command to interact with the associated element to perform the associated operation; and
         when it is determined that the associated element is not yet visible, producing a same operation command after waiting for a predetermined period of time, thereby waiting for the associated element to become visible by repeatedly determining whether the associated element is visible every predetermined period of time;
      wherein the visible interaction with the associated element causes a visible change in the user interface; and
   displaying a next window including the one or plurality of user interface elements.

2. The validation device according to claim 1, wherein the processor is further configured to create a report mentioning a result of inspection of the designated inspection item.

3. The validation device according to any claim 1, wherein the processor is further configured to display the one or plurality of user interface elements by activating the analysis control software.

4. The validation device according to claim 1, wherein:
   the processor is further configured to switch an operation mode between an automatic mode and a manual mode; and
   in the manual mode, the analysis control software causes the display of a same user interface element as the one or plurality of user interface elements to be displayed in the automatic mode.

5. The validation device according to claim 1, wherein a unique identifier is supplied to each of the one or plurality of user interface elements,
   the processor is further configured to:
      execute a preset macro made of a plurality of operation commands for sequentially designating identifiers of the one or a plurality of user interface elements, and
      sequentially execute operations associated with the user interface elements by sequentially creating operation commands for designating identifiers of the user interface elements with the predetermined user interface elements being displayed, based on the macro.

6. A validation method for visually validating analysis control software that controls a chromatography system by executing the analysis control software with a processor, the method comprising:
   displaying to a user with the processor designatable inspection items;
   receiving from the user with the processor a designated inspection item;
   performing with the processor an inspection of the designated inspection item by:
      causing the analysis control software to display a user interface for inspecting the designated inspection item, wherein:
         the user interface includes one or a plurality of user interface elements; and
         each of the one or plurality of user interface elements are associated with an operation performed in the inspection of the analysis control software; and
      sequentially performing operation commands that each visibly interact with an associated element of the one or plurality of user interface elements to perform the associated operation for inspecting the analysis control software, wherein the sequential performance of the operation commands comprises, for each of the operation commands:

determining whether the associated element is visible and whether the operation command is received the analysis control software;

when it is determined that the associated element is visible and the operation command is received by the analysis control software, performing the operation command to interact with the associated element to perform the associated operation; and when it is determined that the associated element is not yet visible, producing a same operation command after waiting for a predetermined period of time, thereby waiting for the associated element to become visible by repeatedly determining whether the associated element is visible every predetermined period of time;

wherein the visible interaction with the associated element causes a visible change in the user interface; and displaying with the processor a next window including the one or plurality of user interface elements.

7. The validation method according to claim 6, wherein a unique identifier is supplied to each of the one or plurality of user interface elements, a macro made of a plurality of operation commands for sequentially designating identifiers of the one or a plurality of user interface elements is preset, and the operations associated with the user interface elements are sequentially executed by the processor by sequential creation of operation commands for designating identifiers of the user interface elements with the predetermined user interface elements being displayed, based on the macro.

8. A non-transitory computer readable medium storing a validation program for visually validating analysis control software that controls a chromatography system by executing the analysis control software with a processor, the validation program causing a processor to:

display to a user designatable inspection items;

receive from the user a designated inspection item;

perform an inspection of the designated inspection item by:

causing the analysis control software to display a user interface for inspecting the designated inspection item, wherein:

the user interface includes one or a plurality of user interface elements; and each of the one or plurality of user interface elements are associated with an operation performed in the inspection of the analysis control software; and sequentially performing operation commands that each visibly interact with an associated element of the one or plurality of user interface elements to perform the associated operation for inspecting the analysis control software, wherein the sequential performance of the operation commands comprises, for each of the operation commands:

determining whether the associated element is visible and whether the operation command is received the analysis control software;

when it is determined that the associated element is visible and the operation command is received by the analysis control software, performing the operation command to interact with the associated element to perform the associated operation; and when it is determined that the associated element is not yet visible, producing a same operation command after waiting for a predetermined period of time, thereby waiting for the associated element to become visible by repeatedly determining whether the associated element is visible every predetermined period of time;

wherein the visible interaction with the associated element causes a visible change in the user interface; and display a next window including the one or plurality of user interface elements.

9. The non-transitory computer readable medium according to claim 8, wherein a unique identifier is supplied to each of the one or plurality of user interface elements, a macro made of a plurality of operation commands for sequentially designating identifiers of the one or a plurality of user interface elements is preset, and the operations associated with the user interface elements are sequentially executed by sequential creation of operation commands for designating identifiers of the user interface elements with the predetermined user interface elements being displayed, based on the macro.

* * * * *